Patented Feb. 6, 1945

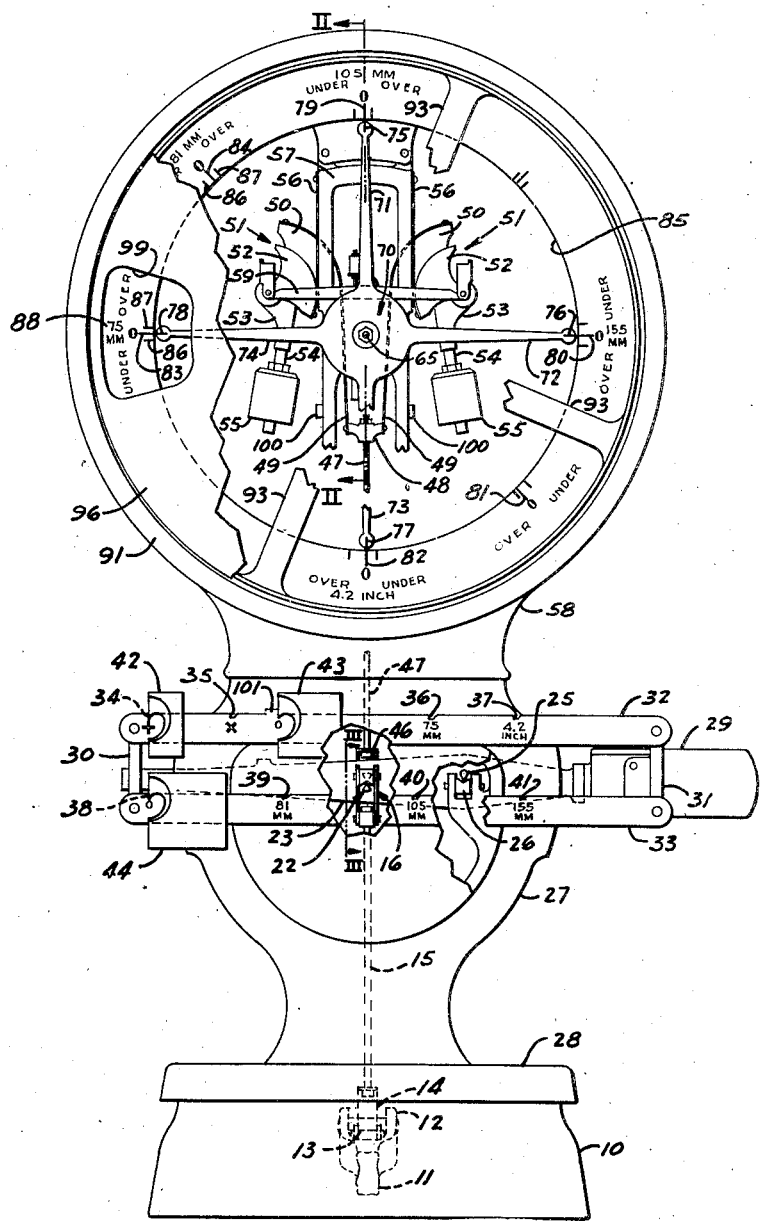
Fig. I
Norman E. Hart
INVENTOR
BY Marshall & Marshall
ATTORNEYS

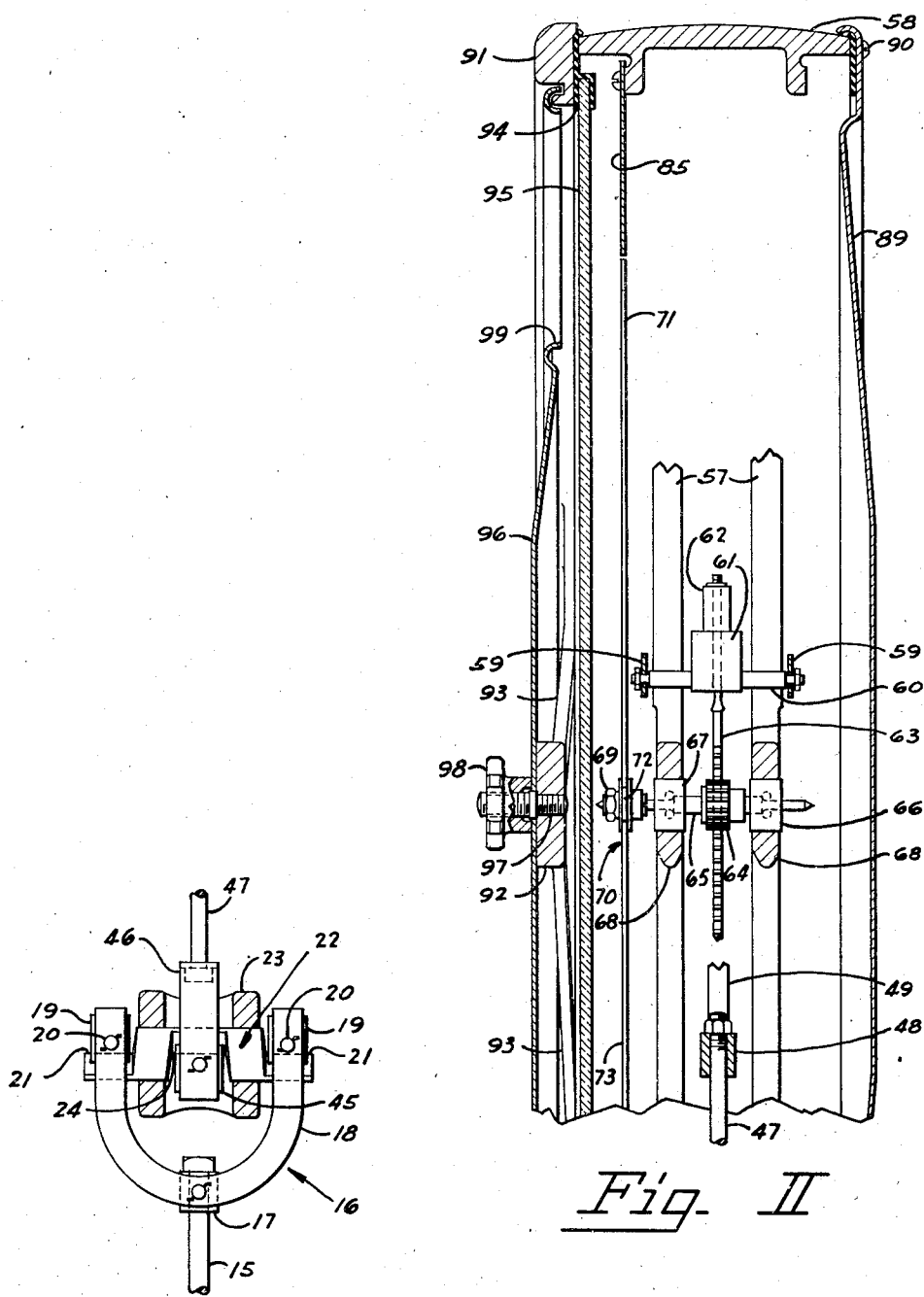

2,368,983

UNITED STATES PATENT OFFICE 2,368,983

WEIGHT TESTING DEVICE

Norman E. Hart, Toledo, Ohio, assignor to Toledo Scale Company, Toledo, Ohio, a corporation of New Jersey Application September 23, 1941, Serial No. 411,971

9 Claims. (Cl. 265—62)

This invention relates generally to testing devices, and more particularly to devices for testing the weight of artillery shells. In the manufacture of artillery shells, or like munitions, it is necessary to ascertain if the weight of each shell is within a predetermined tolerance of the weight of the standard, these tests being carried out during the course of manufacture and/or upon completion of each shell.

Heretofore these tests were usually carried out with the aid of automatically indicating scales of the so-called "over and under" type, each scale being equipped with a chart bearing spaced marks indicating the standard weight and defining the tolerance for one kind of shell and "back-weighted" the amount of its standard weight. Manufacturers, however, usually produce more than one kind of shell and change the production from one kind to another as required. This practice heretofore forced them to purchase, and have on hand, several series of scales, each series being adapted to test one kind of shell only, or to change the indicating charts, since each kind of shell has a different tolerance, and rebalance the scales whenever the production was changed from one kind to another.

The principal object of this invention is the provision of an improved device adapted to test and automatically indicate the variations from the standard weights of several kinds of artillery shells.

Another object is the provision of improved means for rapidly conditioning the scale to test a selected one of a number of different kinds of artillery shells and to automatically indicate the variation from the standard weight.

Another object is the provision of improved means for preventing the observation of the wrong series of weight indications on an indicating scale chart bearing several series; and, Still another object is the provision of improved means for selectively "back-weighting" a testing device having means adapted to indicate "over and under" weight variations.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a front elevation of a device embodying the invention, parts being broken away to more clearly illustrate details of construction.

Fig. II is an enlarged fragmentary transverse sectional view through the housing, the section being along the line II—II of Fig. I; and, Fig. III is an enlarged detail of the means for pivotally connecting the connecting rod to the beam lever, the beam lever being sectioned along the line III—III of Fig. I.

Referring to the drawings in detail:

The device comprises a base 10, preferably a hollow, rigid iron casting, in which is mounted the usual load supporting lever system 11. A nose 12 of this lever system, provided with a pivot 13, engages a suitable bearing in a stirrup 14, suspended from the lower end of a connecting rod 15 the upper end of which is suspended from a stirrup 16. This stirrup comprises a short crosshead 17 (Fig. III), in which the connecting rod 15 is locked, two spaced crescent-shaped plates 18 and a pair of V bearings 19, alignably mounted on pins 20 which extend through suitable apertures adjacent the ends of the crescent-shaped plates 18. The bearings 19, which are positioned between these plates, engage knife edges 21 of a pivot 22 extending through the arms of a bifurcated portion of a beam lever 23. In addition to the knife edges 21, the pivot 22 is provided with another knife edge 24 milled in that portion of the pivot which spans the bifurcation and is directed in opposition to the knife edges 21, the edges of these pivots however being in alignment.

By means of a fulcrum-pivot 25, the beam lever 23 is mounted upon a suitable bearing 26 in the interior of an expanded portion of a hollow column 27 erected upon an extending portion of the base 10. For the purpose of counterbalancing the "pull" due to the dead weight of the lever system 11 and of a load receiving platform 28, mounted upon this lever system, as well as other members of the device assembly, a loading box 29, adapted to be filled with lead or other heavy material, is bolted to an end of the lever 23 extending through an opening in the side of the column 27. The opposite end of the lever, which extends through a similar opening in the other side of the column 27, carries a forwardly extending bracket 30. A similar bracket 31 is secured to the loading box 29, and fastened to these brackets are a pair of beams 32 and 33. The upper edge of the beam 32 is provided with notches 34, 35, 36 and 37, while the beam 33 has notches 38, 39, 40 and 41 milled in its upper edge. The notches serve to position poises 42 and 43 on the beam 32, and poise 44 on the beam 33 so that when positioned in any of the notches they exert a predetermined torque.

To connect the mechanism so far described to load-counterbalancing mechanism and load indicating means, the knife edge 24 engages a bearing 45 of a stirrup 46 suspended from the lower end of a connecting rod 47, the upper end of which is locked in a yoke 48 that is clamped to the lower ends of thin metallic ribbons 49. The upper ends of the ribbons 49 overlie and are clamped to arcuate faces of power sectors 50 which are component parts of load-counterbalancing pendulums 51. In addition to the power sector 50, each pendulum 51 comprises a pair of fulcrum sectors 52, one being stationed on each side of this power sector, and a pendulum body 53 having a downwardly extending stem 54 on which a pendulum weight 55 is adjustably threaded.

Thin metallic ribbons 56, overlying and clamped to the lower ends of arcuate faces of the fulcrum sectors 52, that have their upper ends clamped to machined parallel faces of a pendulum frame 57, serve to support the pendulums 51 in operative position. The pendulum frame 57 is bolted to suitable bosses in the interior of an annular housing 58 which surmounts the column 27. As shown in Fig. I, during assembly, the device is balanced so that when there is no load on the platform 28 the pendulums 51 are partially raised.

When a load is placed on the platform 28, its "pull" is transmitted through the lever system 11 and connecting rods 15, 47 and the ribbons 49 to the pendulums 51. The fulcrum sectors roll upwardly on the ribbons 56 and the pendulum weights 55 swing outwardly until their increased weight moments counterbalance the pull due to the load. Since the angular deflections of the pendulums are functions of the weight of the load, indicating means may be connected to the pendulums to give accurate indications. To accomplish this in the present invention, a pair of so-called compensating plates 59 are pivotally connected at their ends to the centers of revolution of the pendulums in a manner so that they partake of the vertical reciprocatory motion of these pendulums. Openings, located in the compensating plates 59 midway between their points of attachment to the pendulum, support tenoned ends of a rack-supporting shaft 60 (Fig. II). Secured to this shaft is a shock-absorbing member 61 which is substantially C-shaped and made from highly tempered steel. Secured to the free end of this C-shaped member is a foot 62 adapted to adjustably retain a downwardly projecting rack 63 whose teeth mesh with the teeth of a pinion 64 circumjacently mounted on an indicator shaft 65. The opposite ends of this indicator shaft are mounted in ball bearings 66 and 67, positioned in horizontally extending flanges 68 of the pendulum frame 57. Secured to an end of this indicator shaft extending beyond the ball bearing 67, by means of a clamp 69, is a circular hub 70 having four radially extending indicators 71, 72, 73 and 74 bearing index marks 75, 76, 77 and 78 respectively. These index marks, when the device is in balance, are adapted to register with a series of zero indicia 79, 80, 81, 82, 83 and 84 marked on an annular chart 85, bolted to suitable bosses in the interior of the housing 58 so that its inner edge is immediately adjacent the path of movement of the indicators 71 to 74 inclusive. Each of the zero indiciums 79 to 84 inclusive indicate the standard weight of a particular kind of artillery shell and each is flanked as at 86 and 87 by other graduations which indicate the permissible variation from the standard weight of each kind of shell. Each series of graduations is identified as at 88 by an inscription identifying the particular kind of shell and by the words "over and under."

The open rear of the annular housing 57 is covered by a disk 89 which is retained by a plurality of screws 90. Secured to the front of this housing, in a similar manner, is a cast annular frame 91 having a centrally located hub 92 which is connected to the frame by means of a plurality of radially extending spokes 93. An annular channeled rubber gasket 94, interposed between the edge of the housing 58 and the frame 91, is adapted to hold a circular sheet of transparent glass 95 which effectively encloses the front of the housing. For a purpose which will later become clear, a circular shield 96 is rotatably mounted upon the shoulder of a post 97 studded into the hub 92 and is adapted to be locked to this hub by a hand knob 98 threaded on this post. The shield 96 is provided with a segment-like opening 99 positioned therein so that upon rotation of this shield it is adapted to overlie and selectively expose one of the series of weight indicia printed on the chart 85.

Assuming that the device is intended to control the production of artillery shells of the following calibers, among others, viz: 75 mm., 81 mm. and 105 mm., and shells of 75 mm. are to be tested, the operator first conditions the scale to test shells of this caliber by loosening the hand knob 98 and turning the disk 96 until the opening 99 overlies that series of weight indicia on the chart 85 which indicates the standard weight and the permissible tolerance of 75 mm. shells. The operator then moves the poise 43 into the notch 38 in the beam 32. In this position the moment of this poise is equal to the standard weight of a shell of this caliber when resting on the platform 28. The movement of the poise 43 into this position, predetermined by the notch 38, back-weights the device and the pendulums move downwardly until they rest against stops 100. This downward movement of the pendulums is translated into rotation of the indicators by the cooperation of the rack 63 and the pinion 64 and the indicator 74 is thus rotated in an anticlockwise direction, away from the zero indicium 83 and beyond the tolerance zone defined by the graduations 86 and 87. When the shell is now placed on the platform 28, if its weight is correct, the resulting "pull" balances the moment of the poise 43, and the indicator 74 will move in a clockwise direction until its index line 78 registers with the zero indicium 83. Any variation from the standard weight is sensed and compensated for by the pendulums and the indicator will be positioned accordingly. If the indicator comes to rest in the zones defined by the graduation marks 86 and 87, the shell is acceptable. If, however, it comes to rest beyond either of these marks, it must be rejected. When production is changed to 105 mm. shells, the poise 43 is returned to its zero notch in the beam 32 adjacent a stop 101. The poise 44 on the beam 33 is then moved into the notch 40 in this beam. In this position, the moment of the poise 44 is equal to the pull of 105 mm. shell when placed on the platform. The operator then rotates the disk 96, in the manner hereinbefore described, until the opening 99 overlies the series of weight indicia corresponding to shells of 105 mm. caliber. The testing operation then proceeds as hereinbefore described and the weight is indicated by the indicator 71. The same procedure is followed when testing shells of calibers of 155 mm. and 4.2 inches.

Since the corresponding weight series are located on the chart exactly 90° apart, when it is desired to test shells, for example, of 81 mm., the operator first rotates the disk 86 so that the opening 99 overlies the 81 mm. weight series and then after returning the poise 44 into its zero position moves the poise 42 into the notch 35. The moment of this poise in this position merely overbalances the load offsetting pendulums sufficiently to allow the pendulums to move downwardly a distance to rotate the indicator 71 until its index 75 is in registration with the zero indicium 84. He then "backweights" the device by moving the poise 44 into the notch 39 in which position its moment offsets the pull resulting from a 81 mm. shell when placed on the platform 28. The testing operation, of course, is similar to the one previously described.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, means adapted to be conditioned to counterbalance the weight of one of a plurality of articles having various predetermined weights, said means comprising a pendulum, a beam cooperating with said pendulum and a poise slidably mounted upon said beam, a plurality of poise positioning means on said beam for cooperation with said poise to selectively condition said weight counterbalancing means, indicating means actuated by said weight counterbalancing means, said indicating means comprising a chart and a relatively movable indicator, said chart bearing a plurality of series of indicia, each series being spaced from each other and comprising an indicium indicating the correct predetermined weight of one of such articles and indicia spaced on each side of such correct predetermined weight indicium to indicate limits of permissible variation, said indicator having a plurality of indices spaced to register with such spaced series of indicia for directly indicating the condition of balance when articles having weights corresponding to such spaced series of indicia are being counterbalanced, said chart bearing another plurality of series of indicia spaced from each other and interspersed between such first mentioned plurality of series, each series of indicia of such secondly mentioned plurality also comprising an indicium to indicate correct weight and indicia to indicate permissible variation of the weight of such articles, means on said beam for further conditioning said weight counterbalancing means whereby such indices on said indicator are caused to register with such interspersed plurality of series of indicia on said chart for directly indicating the condition of balance when articles having weights corresponding to such interspersed series of indicia are being counterbalanced, said secondly mentioned conditioning means comprising a poise; and a disk-like member having a single opening rotatably mounted in front of said indicating means for exposing to view only one of such series of indicia on said chart.

2. In a device of the class described, in combination, means adapted to be conditioned to counterbalance the weight of one of a plurality of articles having various predetermined weights, said means comprising a pendulum, a beam cooperating with said pendulum and a poise slidably mounted upon said beam, a plurality of poise positioning means on said beam for cooperation with said poise to selectively condition said weight counterbalancing means, indicating means actuated by said weight counterbalancing means, said indicating means comprising a chart having a plurality of series of indicia marked thereon, each of such series being spaced from each other and an indicator having a plurality of indices spaced to register with said spaced series of indicia for directly indicating the condition of balance when articles having weights corresponding to such spaced indicia are being counterbalanced, said chart having another plurality of series of indicia spaced from each other but interspersed between such first mentioned plurality of series, means on said beam for further conditioning said weight counterbalancing means whereby such indices on said indicating means are caused to register with such interspersed plurality of series of indicia on said chart for indicating the condition of balance when articles having weights corresponding to such interspersed series of indicia are being counterbalanced, said secondly mentioned conditioning means comprising a poise and a disk-like member having a single opening rotatably mounted in front of said indicating means for exposing to view only one of such plurality of series of indicia on said chart.

3. In a device of the class described, in combination, means adapted to be selectively conditioned to counterbalance the weight of a plurality of articles having various predetermined weights, said means comprising a pendulum, a beam cooperating with said pendulum and a poise slidably mounted upon said beam, said beam having a series of predetermined poise positioning means, each of such positioning means being adapted when said poise is positioned thereby to condition the device to counterbalance the predetermined weight of one of such plurality of articles, said pendulum being adapted to sense variations in the weight of such article, indicating means cooperating with said weight counterbalancing means comprising a relatively movable chart and indicator, said chart bearing a plurality of series of weight indicia, each one of such series of indicia corresponding to the weight of one of such plurality of articles and including an indicium indicating the correct weight of such article and indicia flanking said indicium to indicate the permissible variation in the weight of such article, there being such a series of indicia on said chart corresponding to each of said poise positioning means, said indicator having a plurality of indices spaced to register with the correct weight indicia of certain of such plurality of series of weight indicia borne by said chart, a second poise on said beam for conditioning the device to cause said indices on said indicator to register with others of such plurality of series of weight indicia on said chart, and manipulative means for exposing to view only that series of indicia on said chart corresponding to that poise positioning means according to which said firstly mentioned poise is positioned.

4. In a device of the class described, in combination, means adapted to be selectively conditioned to counterbalance the weight of a plurality of articles having various predetermined weights, said means comprising a pendulum, a beam cooperating with said pendulum and a poise slidably mounted upon said beam, said beam having a series of predetermined poise positioning means, each of such positioning means being adapted when said poise is positioned thereby to condition the device to counterbalance the predetermined weight of one of such plurality of articles, said pendulum being adapted to sense variations in the weight of such article, indicating means cooperating with said weight counterbalancing means comprising a relatively movable chart and indicator, said chart bearing a plurality of series of weight indicia, each one of such series of indicia corresponding to the weight of one of such plurality of articles and including an indicium indicating the correct weight of such article and indicia flanking said indicium to indicate the permissible variation in the weight of such article, there being such a series of indicia on said chart corresponding to each of said poise positioning means, said indicator having a plurality of indices spaced to register with the correct weight indicia of certain of such plurality of series of weight indicia borne by said chart, and a second poise on said beam for conditioning the device to cause said indices on said indicator to register with others of such plurality of series of weight indicia on said chart.

5. In a device of the class described, in combination, means adapted to be selectively conditioned to counterbalance the weight of a plurality of articles having various predetermined weights, said means comprising a pendulum, a beam cooperating with said pendulum and a poise slidably mounted upon said beam, said beam having a series of predetermined poise positioning means, each of such positioning means being adapted when said poise is positioned thereby to condition the device to counterbalance the predetermined weight of one of such plurality of articles, said pendulum being adapted to sense variations in the weight of such article, indicating means cooperating with said weight counterbalancing means comprising a relatively movable chart and indicator, said chart bearing a plurality of series of weight indicia, each one of such series of indicia corresponding to the weight of one of such plurality of articles and including an indicium indicating the correct weight of such article and indicia flanking said indicium to indicate the permissible variation in the weight of such article, there being such a series of indicia on said chart corresponding to each of said poise positioning means, and manipulative means for exposing to view only that series of indicia corresponding to that poise positioning means according to which said poise is positioned.

6. In a device of the class described, in combination, means adapted to be conditioned to counterbalance the weight of one of a plurality of articles having various predetermined weights, said means comprising a pendulum, a beam cooperating with said pendulum and a poise slidably mounted upon said beam, a plurality of poise positioning means on said beam for cooperation with said poise to selectively condition said weight counterbalancing means, indicating means actuated by said weight counterbalancing means, said indicating means comprising a chart having a plurality of series of indicia marked thereon, each of such series being spaced from each other and an indicator having a plurality of indices spaced to register with such spaced series of indicia, for directly indicating the condition of balance when articles having weights corresponding to such spaced indicia are being counterbalanced, said chart having another plurality of series of indicia spaced from each other but interspersed between said first mentioned plurality, and means on said beam for further conditioning said weight counterbalancing means whereby such indices on said indicating means are caused to register with such interspersed plurality of series of indicia on said chart for indicating the condition of balance when articles having weights corresponding to such interspersed series of indicia are being counterbalanced.

7. In a device of the class described, in combination, means adapted to be conditioned to counterbalance the weight of one of a plurality of articles having various predetermined weights, said means comprising a pendulum, a beam cooperating with said pendulum and a poise slidably mounted upon said beam, said beam having a series of predetermined positioning means for cooperation with said poise, indicating means actuated by said counterbalancing means for directly indicating the condition of balance when the weight of a selected one of such plurality of articles is being counterbalanced, said indicating means comprising a chart having a plurality of series of indicia marked thereon and a rotatable member having a plurality of index lines for cooperation with such plurality of series of indicia, and an opaque disk rotatably mounted in front of said chart and having a single opening for exposing one series of indicia of such plurality marked on said chart.

8. In a device of the class described, in combination, means adapted to be conditioned to counterbalance the weight of one of a plurality of articles each having a different predetermined weight, such means comprising a pendulum, a beam cooperating with said pendulum and a poise slidably mounted upon said beam, said beam having means for positively positioning said poise at any of a plurality of predetermined positions; and indicating means actuated by said counterbalancing means for directly indicating the condition of balance when the weight of a selected one of such plurality of articles is being counterbalanced, said indicating means comprising a chart having a plurality of series of indicia marked thereon, each of said series having indicia to indicate the excess or deficiency of weight of one of said articles from the corresponding predetermined weight and a rotatable member having a plurality of index lines for cooperation with such plurality of series of indicia.

9. In a device of the class described, in combination, means adapted to be selectively conditioned to counterbalance the weight of a plurality of articles having various predetermined weights, said means comprising an automatic counterbalance, a beam cooperating with said automatic counterbalance and a poise slidably mounted upon said beam, said beam having a series of predetermined poise positioning means, each of such positioning means being adapted when said poise is positioned thereby to condition the device to counterbalance the predetermined weight of one of such plurality of articles, said automatic counterbalance being adapted to sense variations in the weight of such article, indicating means cooperating with said automatic counterbalancing means comprising a relatively movable chart and indicator, said chart bearing a plurality of series of weight indicia, each one of such series of indicia corresponding to the weight of one of such plurality of articles and including an indicium indicating the correct weight of such article and indicia flanking said indicium to indicate the permissible variation in the weight of such article, there being such a series of indicia on said chart corresponding to each of said poise positioning means, and manipulative means for exposing to view only that series of indicia corresponding to that poise positioning means according to which said poise is positioned.

NORMAN E. HART.